US012560759B2

(12) United States Patent
Arai et al.

(10) Patent No.: US 12,560,759 B2
(45) Date of Patent: Feb. 24, 2026

(54) OPTICAL WAVEGUIDE ELEMENT, OPTICAL MODULATION DEVICE USING OPTICAL WAVEGUIDE ELEMENT, AND OPTICAL TRANSMISSION DEVICE USING OPTICAL WAVEGUIDE ELEMENT

(71) Applicant: SUMITOMO OSAKA CEMENT CO., LTD., Tokyo (JP)

(72) Inventors: Junji Arai, Tokyo (JP); Yumi Murata, Tokyo (JP); Yuki Kugimoto, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 252 days.

(21) Appl. No.: 18/283,764

(22) PCT Filed: Mar. 30, 2022

(86) PCT No.: PCT/JP2022/015879
§ 371 (c)(1),
(2) Date: Sep. 22, 2023

(87) PCT Pub. No.: WO2022/210852
PCT Pub. Date: Oct. 6, 2022

(65) Prior Publication Data
US 2024/0176071 A1 May 30, 2024

(30) Foreign Application Priority Data

Mar. 30, 2021 (JP) ................................. 2021-058578

(51) Int. Cl.
*G02B 6/122* (2006.01)
*G02B 6/12* (2006.01)
(52) U.S. Cl.
CPC .... *G02B 6/122* (2013.01); *G02B 2006/12142* (2013.01)

(58) Field of Classification Search
None
See application file for complete search history.

(56) References Cited

U.S. PATENT DOCUMENTS 8,351,752 B2 * 1/2013 Shibata .................. G02B 6/138
385/132
2005/0117847 A1 * 6/2005 Ono ......................... G02B 6/30
385/49

(Continued)

FOREIGN PATENT DOCUMENTS

JP      H6-1994-281898 A    10/1994
JP      H7-1995-19711 U      4/1995

(Continued)

*Primary Examiner* — Jerry Rahll
(74) *Attorney, Agent, or Firm* — IpHorgan Ltd.

(57) ABSTRACT

Provided is an optical waveguide element whereby it is possible to prevent dropout of an optical component due to internal stress that occurs in a joint between the optical component and an optical waveguide member including a substrate on which an optical waveguide is formed, and to simplify a manufacturing step pertaining to polishing of a joining surface. An optical waveguide element comprising: an optical waveguide member including a substrate 1 on which an optical waveguide is formed; and an optical component 3 that is fixed to an optical waveguide member end surface (B0) on which an input part or an output part of the optical waveguide is disposed, and that transmits input light inputted to the input part or transmits output light outputted from the output part, wherein the optical waveguide element is characterized in that portions (B1, B2) having greater roughness than the end surface (B0) of the optical waveguide member including the input part or the output part are provided in at least a portion of the optical waveguide member, which is the portion thereof to which the optical component 3 is fixed.

12 Claims, 5 Drawing Sheets

(56) References Cited

U.S. PATENT DOCUMENTS

| | | |
|---|---|---|
| 2014/0286607 A1 | 9/2014 | Ejiri |
| 2015/0117812 A1 | 4/2015 | Brooks |
| 2019/0162984 A1 | 5/2019 | Sugiyama |
| 2021/0018771 A1 | 1/2021 | Itou |
| 2021/0157176 A1 | 5/2021 | Miyazaki |
| 2021/0302765 A1 | 9/2021 | Ichimei |

FOREIGN PATENT DOCUMENTS

| | | |
|---|---|---|
| JP | 2005-157088 A | 6/2005 |
| JP | 2009-237326 A | 10/2009 |
| JP | 2014-209206 A | 11/2014 |
| JP | 2019-95698 A | 6/2019 |
| JP | 2019-179193 A | 10/2019 |
| JP | 2020-003701 A | 1/2020 |
| JP | 2021-162643 A | 10/2021 |

* cited by examiner

FIG. 1    (Prior Art)
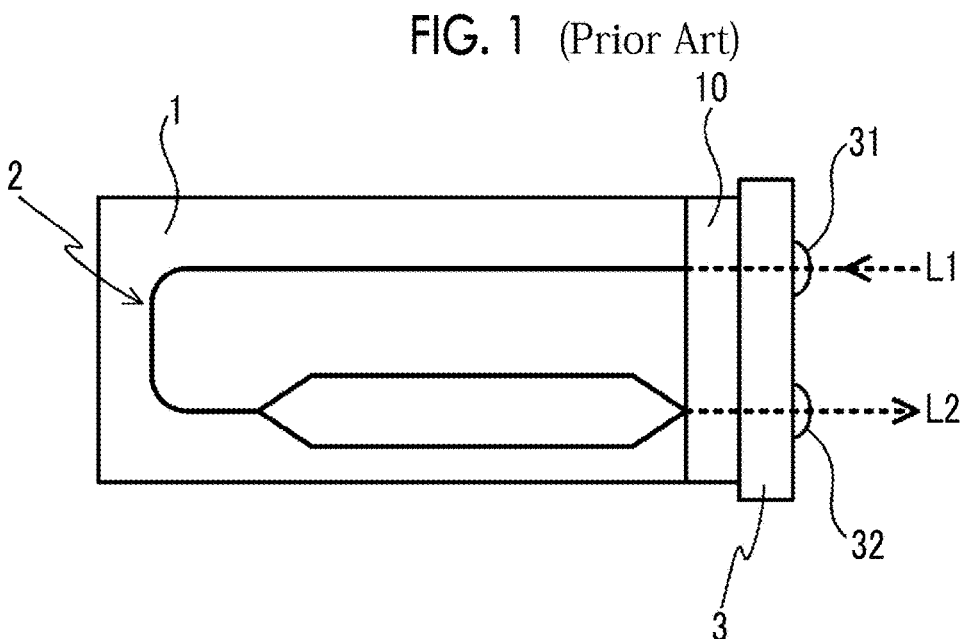
FIG. 2A    (Prior Art)
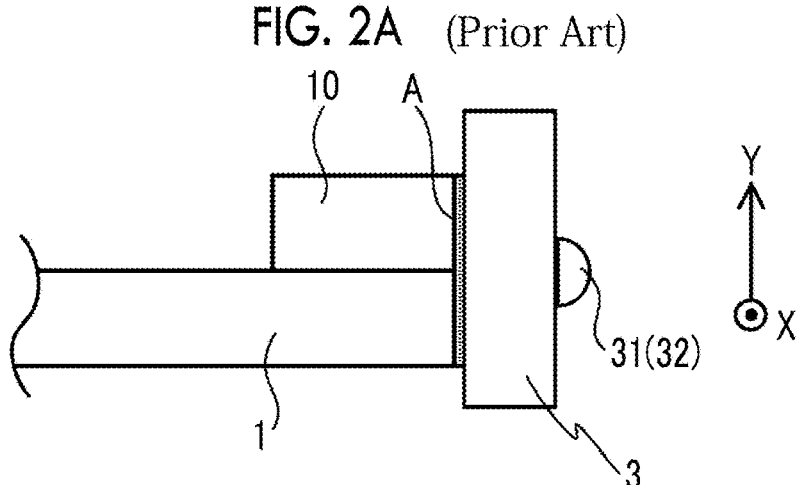
FIG. 2B    (Prior Art)
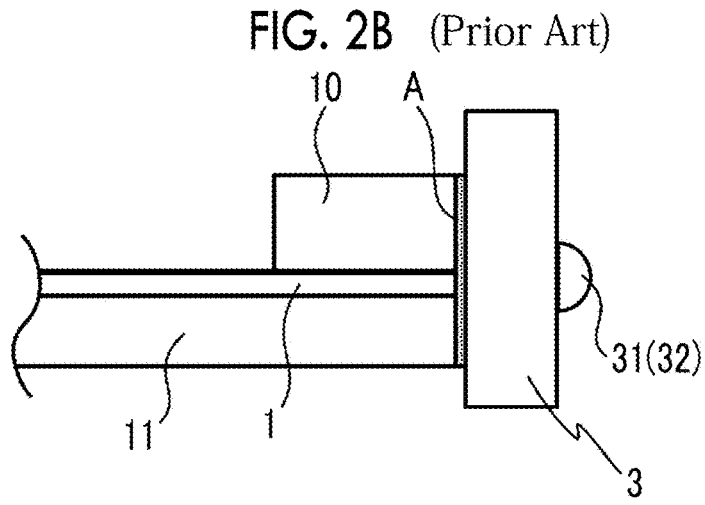

FIG. 7
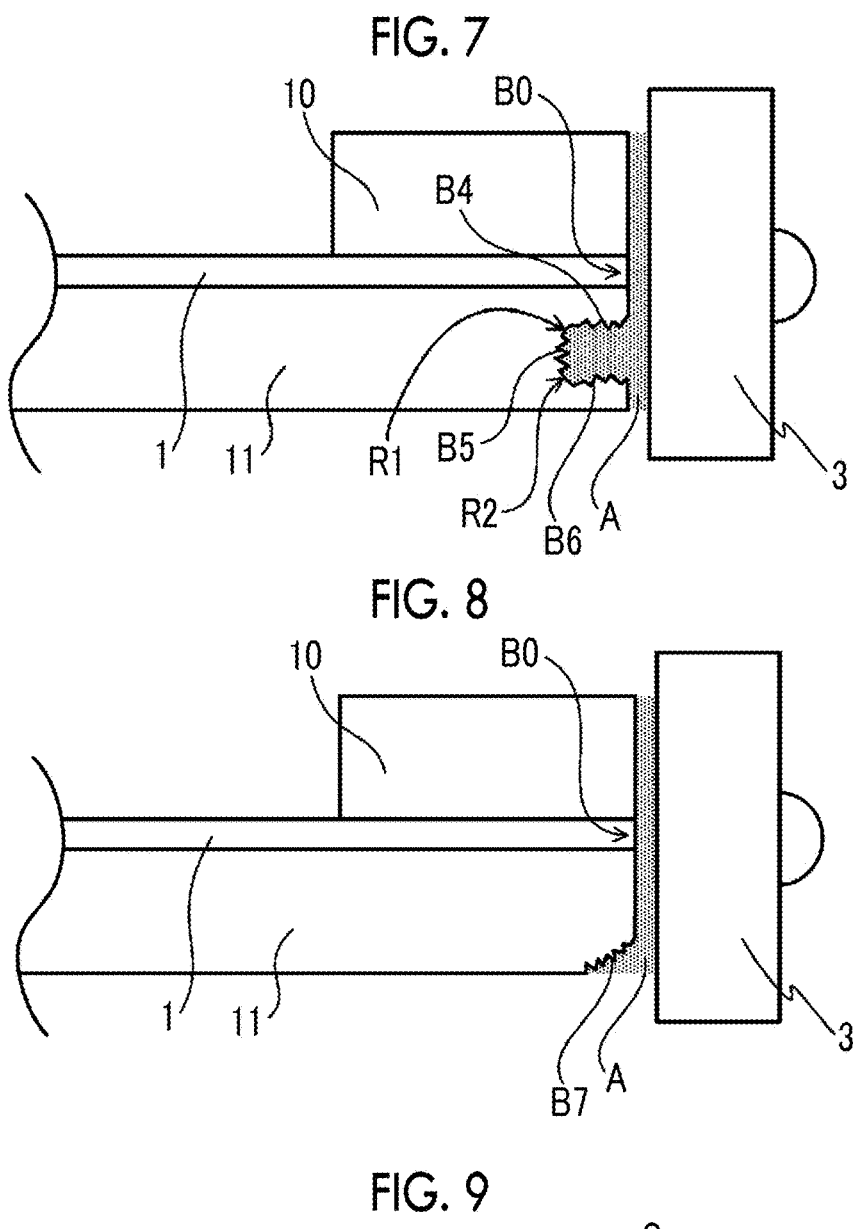
FIG. 8
FIG. 9
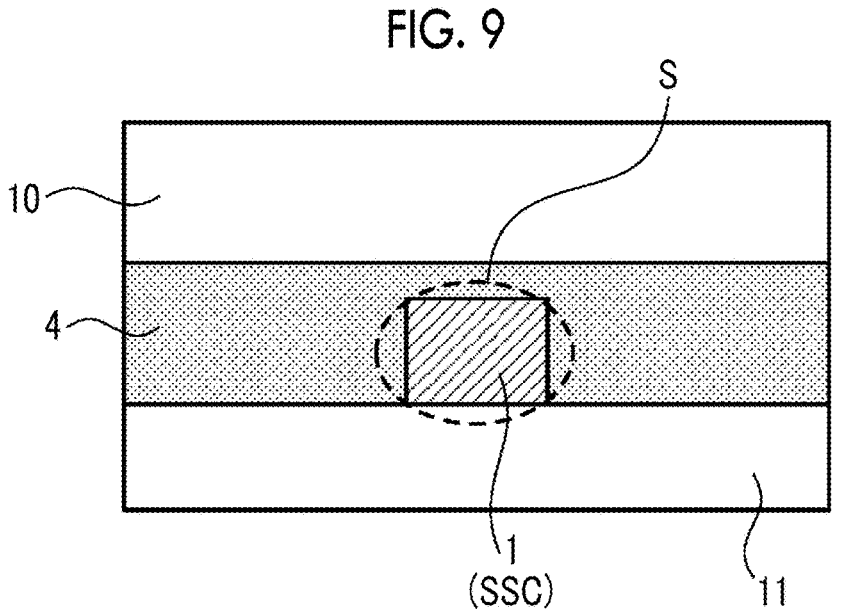

OPTICAL WAVEGUIDE ELEMENT,
OPTICAL MODULATION DEVICE USING
OPTICAL WAVEGUIDE ELEMENT, AND
OPTICAL TRANSMISSION DEVICE USING
OPTICAL WAVEGUIDE ELEMENT

CROSS REFERENCE TO RELATED
APPLICATIONS

This application is a national stage completion application of PCT Application No. PCT/JP2022/015879, filed Mar. 30, 2022, and claims priority from Japanese Patent Application No. 2021-058578 filed Mar. 30, 2021. Each of these applications is incorporated by reference herein in its entirety.

TECHNICAL FIELD

The present invention relates to an optical waveguide device, and an optical modulation device and an optical transmission apparatus using the same, and particularly to an optical waveguide device including an optical waveguide member that includes a substrate on which an optical waveguide is formed, and an optical component that is fixed to an end surface of the optical waveguide member on which an input port or an output port of the optical waveguide is disposed and that allows transmission of input light into the input port or transmission of output light from the output port.

BACKGROUND ART

In the field of optical measurement technology or in the field of optical communication technology, optical waveguide devices such as an optical modulator using a substrate on which an optical waveguide is formed have been widely used. An optical modulation element (a lithium niobate (LN) chip) is formed by forming a control electrode for controlling a light wave propagating through the optical waveguide on the optical waveguide device using the substrate of LN or the like having an electro-optic effect. The LN chip is mounted inside a case of metal or the like, and an optical lens is adhesively fixed to an end surface of the optical waveguide device to input or output the light wave into or from the optical waveguide of the optical waveguide device.

By using the optical lens, an optical modulator having good coupling efficiency between the input light or the output light and the optical waveguide can be provided. Even in a case where a position at which the LN chip is mounted in the case deviates, a low-insertion loss configuration can be implemented by adjusting a position and an angle of the lens.

In recent years, in order to deal with size reduction and band widening of an optical modulation device in which the optical waveguide device is mounted inside the case, combining two polarization beams of signal light output from the optical waveguide device has been suggested as in Patent Literature No. 1. In addition, as illustrated in FIG. 1, a configuration of disposing an input port and an output port of an optical waveguide 2 on one side surface of the optical waveguide device to input (L1) and output (L2) the light wave into and from one side surface of the case has been suggested. In these optical waveguide devices, since a plurality of input ports and output ports related to the light wave are disposed on the same end surface of the substrate, an area of contact between the substrate end surface and the optical component is increased.

In FIG. 1, an optical block (optical component) 3 on which optical lenses (31, 32) are formed (or held) is bonded to one side surface of the optical waveguide device. FIG. 2A is a diagram of a view from a side surface direction (a lower side in FIG. 1) illustrating a state where the optical waveguide device (substrate 1) and the optical block 3 are bonded to each other. A reinforcing block 10 is adhesively fixed to an upper portion of the substrate 1 on an end surface side by an adhesive (not illustrated). The optical block 3 is adhesively fixed to end surfaces of the substrate 1 and the reinforcing block 10 by an adhesive A. In addition, in a case where the substrate 1 is configured as a thin plate of 30 μm or lower or as a thin film having a thickness of 1 μm or lower, it is possible to increase mechanical strength of the substrate by disposing a holding substrate 11 via joining to the thin plate (thin film) 1 as illustrated in FIG. 2B. Hereinafter, a structure of only the substrate on which the optical waveguide is formed or of the substrate to which at least one of the holding substrate or the reinforcing block is added will be referred to as the "optical waveguide member".

The optical block (optical component) is not limited to the optical lens described above and may be an optical block on which another optical member such as a reflective member or a polarizer used in polarization combining or the like is integrally formed or held, or a spacer or the like for fixing the reflective member or a component of the reflective member. In addition, the optical component adhesively fixed to the substrate 1 and to the reinforcing block 10 is not limited to the optical block and includes a configuration in which an optical fiber fixed to a holding member having a sleeve (cylindrical) shape or to a V-groove substrate is directly bonded to the end surface of the substrate 1.

As illustrated in FIGS. 2A and 2B, in joining the optical component 3 to the optical waveguide member such as the substrate 1 (including the holding substrate 11) or the reinforcing block 10, an end surface of the optical waveguide member and an end surface of the optical component in a joined part are formed to be in a specular surface state. In a case where the end surfaces in the specular surface state are set to face each other and joined by an adhesive, a surface area is small compared to that in a case where the surfaces to be joined are rough surfaces, and an anchoring effect is not obtained. Thus, this causes a decrease in adhesion strength between both of the end surfaces.

Meanwhile, ferroelectric materials such as LN are used in the substrate constituting the optical waveguide device, and materials such as LN are also used in the reinforcing block to match a linear expansion coefficient between the reinforcing block and the substrate 1.

On the other hand, glass (organic glass, optical glass, and the like) and plastic are used as a material of the optical component. Thus, a difference in a coefficient of thermal expansion (linear expansion coefficient) may be $5 \times 10^{-6}/°$ C. or higher among the LN substrate constituting the optical waveguide member, the holding substrate or the reinforcing block, and the optical block (optical component).

As long as the optical waveguide of the substrate 1 is not adversely affected, the same material can be used in the reinforcing block and in the holding substrate 11 to match not only the linear expansion coefficient but also Vickers hardness. Thus, surface accuracy during substrate cutting can be improved.

In addition, regarding a size of the optical waveguide device, a chip width is approximately 0.5 to 3 mm, and a total thickness of the reinforcing block and the substrate of the optical waveguide device is approximately 1 to 2 mm. Particularly, in the case of polarization combining or of a folded structure in which input and output are performed on the same end surface as illustrated in FIG. 1, the chip width is increased above 1.5 mm, and an area of adhesion between the optical block (optical component) 3 and the substrate 1 is further increased. Thus, this case is likely to be affected by a difference in the coefficient of thermal expansion between the substrate (including the holding substrate) or the reinforcing block and the optical component.

In a case where the joined members have different coefficients of thermal expansion, internal stress is generated in the joined part because of a change in a temperature of an environment. Thus, this results in problems such as a change in optical characteristics, a crack in the joined part, or detachment of the optical component. This tendency is noticeable particularly in a case where the coefficients of thermal expansion are different between directions parallel to the surfaces to be joined, such as a thickness direction (Y axis direction) and a width direction (X axis direction) of the optical waveguide device as illustrated in FIG. 2A.

As a method of eliminating such problems, the present applicant has presented a method of further decreasing the area of the joined part as disclosed in Patent Literature No. 2.

Furthermore, in order to finish the surfaces to be joined as specular surfaces, it is required to perform polishing processing on the end surfaces after cutting the substrate, and this also poses a problem of requiring more processing time.

CITATION LIST

Patent Literature

[Patent Literature No. 1] Japanese Laid-open Patent Publication No. 2020-003701
[Patent Literature No. 2] Japanese Patent Application No. 2020-062129 (filing date: Mar. 31, 2020)

SUMMARY OF INVENTION

Technical Problem

An object to be solved by the present invention is to solve the above problem and to provide an optical waveguide device that can prevent detachment of an optical component caused by internal stress generated in a joined portion between the optical component and an optical waveguide member including a substrate on which an optical waveguide is formed and that can simplify a manufacturing process related to polishing processing of a surface to be joined. In addition, an optical modulation device and an optical transmission apparatus using the optical waveguide device are provided.

Solution to Problem

In order to solve the object, an optical waveguide device of the present invention, and an optical modulation device and an optical transmission apparatus using the same have the following technical features.
(1) An optical waveguide device includes an optical waveguide member that includes a substrate on which an optical waveguide is formed, and an optical component that is fixed to an end surface of the optical waveguide member on which an input port or an output port of the optical waveguide is disposed and that allows transmission of input light into the input port or transmission of output light from the output port, in which a rough part having higher roughness than the end surface of the optical waveguide member including the input port or the output port is provided in a part which is at least a part of the optical waveguide member and to which the optical component is fixed.
(2) In the optical waveguide device according to (1), a notched portion is provided in a part of the optical waveguide member, and the rough part is provided on at least a part of a surface on which the notched portion is formed.
(3) In the optical waveguide device according to (2), a depth of the notched portion is set within a range of 5 μm or higher and 300 μm or lower from the end surface including the input port or the output port.
(4) In the optical waveguide device according to any one of (1) to (3), the optical component has a different coefficient of thermal expansion from at least a part of a member constituting the end surface of the optical waveguide member in a direction parallel to the end surface of the optical waveguide member.
(5) In the optical waveguide device according to any one of (1) to (4), a spot size converter is provided in at least one of the input port or the output port of the optical waveguide.
(6) In the optical waveguide device according to any one of (1) to (5), an adhesive for joining the optical component is provided on at least a part of the rough part.
(7) In the optical waveguide device according to any one of (1) to (6), roughness Ra of the rough part is 50 nm or higher.
(8) In the optical waveguide device according to any one of (1) to (7), a distance from any of the input port or the output port to a position at which the rough part is formed is set within a range of 5 μm or higher and 300 μm or lower.
(9) In the optical waveguide device according to any one of (1) to (8), at least a part of the rough part protrudes to an optical component side with respect to the input port or the output port.
(10) In the optical waveguide device according to any one of (1) to (9), at least a part of a location in which a curved surface is formed in a region in which the rough part is formed has lower roughness than an other rough part.
(11) An optical modulation device includes the optical waveguide device according to any one of (1) to (10) including an electrode that modulates a light wave propagating through the optical waveguide, a case accommodating the optical waveguide device, and an optical fiber through which the light wave is input into the optical waveguide or output from the optical waveguide.
(12) In the optical modulation device according to (11), an electronic circuit that amplifies a modulation signal to be input into the optical waveguide device is provided inside the case.
(13) An optical transmission apparatus includes the optical modulation device according to (11) or (12), and an electronic circuit that outputs a modulation signal causing the optical modulation device to perform a modulation operation.

Advantageous Effects of Invention

In the present invention, an optical waveguide device includes an optical waveguide member that includes a substrate on which an optical waveguide is formed, and an optical component that is fixed to an end surface of the optical waveguide member on which an input port or an output port of the optical waveguide is disposed and that allows transmission of input light into the input port or transmission of output light from the output port, in which a rough part having higher roughness than the end surface of the optical waveguide member including the input port or the output port is provided in a part which is at least a part of the optical waveguide member and to which the optical component is fixed. Thus, joining strength to an optical component side can be increased using the rough part, and detachment of the optical component can be prevented. In addition, since the rough part other than the optical waveguide part that is required to be formed as a specular surface in terms of performance can be used on a surface to be joined, a manufacturing process related to polishing processing of the surface to be joined can be simplified.

BRIEF DESCRIPTION OF DRAWINGS

FIG. 1 is a plan view illustrating an example of an optical waveguide device in the related art.

FIGS. 2A and 2B are side views of the optical waveguide device in FIG. 1: FIG. 2A illustrates a case where a substrate 1 is thick, and FIG. 2B illustrates a case where a holding substrate 11 is joined to the thin plate (thin film) 1.

FIG. 3A illustrates a case where an adhesive is applied to a rough part B1, and FIG. 3B illustrates a case where an adhesive is applied to more rough parts (B1, B2) than the case in FIG. 3A.

FIG. 5A illustrates a case where an optical component is disposed parallel to a surface of a rough part B3, and FIG. 5B illustrates a case where the optical component is disposed to be inclined with respect to the surface of the rough part B3.

FIG. 7 is a side view for describing a third example related to the optical waveguide device of the present invention.

FIG. 8 is a side view for describing a fourth example related to the optical waveguide device of the present invention.

FIG. 9 is a diagram for describing an example of using a spot size converter in the optical waveguide device of the present invention.

DESCRIPTION OF EMBODIMENTS

Figures 3A, 3B, 4A, 4B:
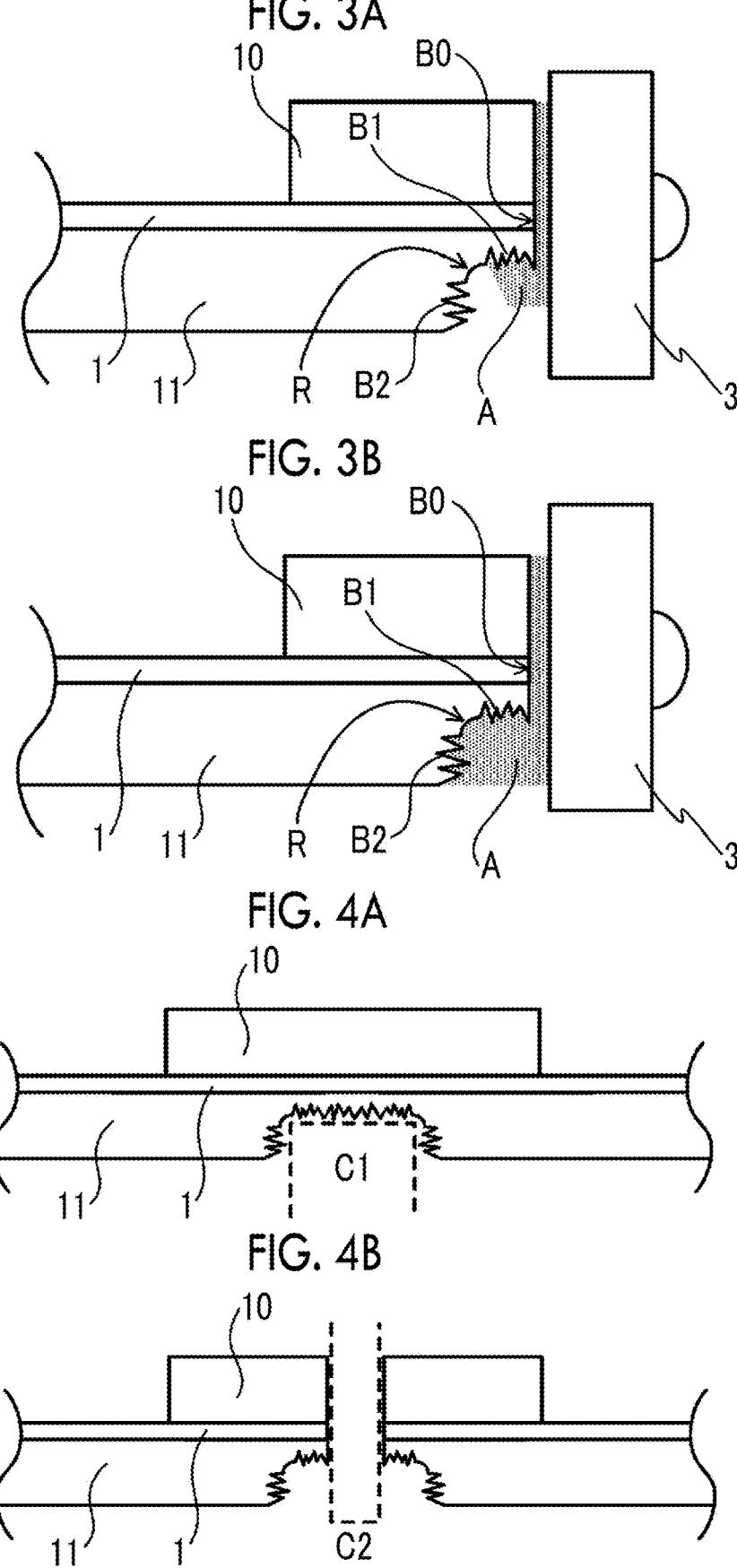
FIGS. 3A and 3B are side views for describing a first example of an optical waveguide device of the present invention.
FIGS. 4A and 4B are diagrams for describing a part of a process of manufacturing the optical waveguide device in FIGS. 3A and 3B.

Hereinafter, an optical waveguide device of the present invention will be described in detail using preferred examples.

As illustrated in FIGS. 3A and 3B to 10, the optical waveguide device of the present invention includes an optical waveguide member that includes a substrate 1 on which an optical waveguide is formed, and an optical component 3 that is fixed to an end surface (B0) of the optical waveguide member on which an input port or an output port of the optical waveguide is disposed and that allows transmission of input light into the input port or transmission of output light from the output port, in which a rough part (B1 to B6) having higher roughness than the end surface (B0) of the optical waveguide member including the input port or the output port is provided in a part which is at least a part of the optical waveguide member and to which the optical component 3 is fixed.

In the following description, an example in which a holding substrate 11 and a reinforcing block 10 are combined with the substrate 1 as the optical waveguide member will be mainly described.

As a material of the substrate 1 used in the optical waveguide device of the present invention, a substrate of a ferroelectric material having an electro-optic effect, specifically lithium niobate (LN), lithium tantalate (LT), lead lanthanum zirconate titanate (PLZT), or the like, a vapor-phase growth film formed of these materials, or the like can be used. In addition, various materials such as semiconductor materials or organic materials can also be used as the substrate of the optical waveguide device.

A thickness of the substrate 1 on which the optical waveguide is formed may be set to 10 μm or lower and more preferably 5 μm or lower to improve modulation efficiency by strengthening confinement of a light wave propagating through the optical waveguide. In this case, the holding substrate 11 having a thickness of 0.2 to 1 mm is bonded via direct joining or through an adhesive to reinforce mechanical strength of the substrate 1. LN, quartz, Si, molten glass, alumina, and the like can be applied as a material of the holding substrate.

In the optical waveguide device of the present invention, the "substrate on which the optical waveguide is formed" does not simply mean only one substrate and includes a case where a vapor-phase growth film is formed on the holding substrate and where the film (thin film) is processed into the optical waveguide.

As a method of forming the optical waveguide on the substrate 1, a method of thermally diffusing a high-refractive index material such as Ti in the substrate or a method of forming a high-refractive index part using a proton exchange method can be used. In addition, a rib type optical waveguide obtained by forming a part corresponding to the optical waveguide to have a protruding shape in the substrate can be formed using a method of etching a substrate part other than the optical waveguide, a method of forming grooves on both sides of the optical waveguide, or the like. Furthermore, the rib type optical waveguide and the optical waveguide obtained using the thermal diffusion method or the like can be used together.

In addition, in the case of using the optical waveguide having a small width, such as the optical waveguide of which a mode field diameter (MFD) is 1 μm or lower, a spot size converter (SSC) that changes the MFD can be provided in the input port or the output port of the optical waveguide as a part of the optical waveguide. As will be described later, in a case where the SSC is present, the "rough part" of the present invention is formed at a position at which the light wave propagating through the SSC is not affected.

The reinforcing block 10 is disposed to be fixed to an upper portion of the substrate 1 on an end surface side on which the input port or the output port of the light wave is formed. A material having Vickers hardness similar to that of the reinforcing substrate 11 is used in the reinforcing block 10 to improve surface accuracy during substrate cutting. As long as the optical waveguide of the substrate 1 is not adversely affected, the same material as the holding substrate 11 can be used to match not only the Vickers hardness but also a linear expansion coefficient. An end surface (a surface on the same side as the end surface of the substrate 1) of the reinforcing block 10 is used as a surface to be joined to which the optical component such as an optical block adheres, as necessary.

The optical component includes the optical block that holds an optical lens, a reflective member, a polarizer, or the like, a holding member having a sleeve (cylindrical) shape or a V-groove substrate that holds an optical fiber near an end portion of the optical fiber, and the like. A glass material such as organic glass or optical glass or a plastic material is used as a material constituting the optical component.

An LN substrate has a coefficient of thermal expansion (linear expansion coefficient) of $4.0\times10^{-6}/°$ C. in a Z axis direction and of $14.0\times10^{-6}/°$ C. in an X axis (Y axis) direction. In a case where the optical component includes, for example, an optical glass material such as BK-7, the linear expansion coefficient is $7.1\times10^{-6}/°$ C. In a case where the optical component is bonded to the LN substrate, presence of an X axis or of a Y axis on a surface of the LN substrate to be joined results in a difference in the linear expansion coefficient of $5.0\times10^{-6}/°$ C. or higher between both of the LN substrate and the optical component, and the difference is noticeable. Consequently, a positional deviation of the optical component or peeling or detachment of the optical component occurs in accordance with a change in a temperature of the substrate or of an environment or the like.

In addition, a material having a linear expansion coefficient similar to that of the substrate used in the optical waveguide device is selected for a case of metal or the like that accommodates the optical waveguide device. While stainless steel is widely used in the case of the LN substrate, a linear expansion coefficient of stainless steel is $17.3\times10^{-6}/°$ C., which is significantly different from the linear expansion coefficient of the optical component. Thus, the optical component is not joined to the case and is only joined to the substrate 1 or to the reinforcing block 10 to be held. In a case where an element of quartz glass or the like having a low linear expansion coefficient is used in the holding substrate 11, a material such as Kovar having a low linear expansion coefficient may be used in the case.

As illustrated in FIGS. 3A and 3B to 10, a feature of the optical waveguide device of the present invention is forming the "rough part" having higher surface roughness than the end surface B0 on which the input port or the output port of the light wave is formed, in at least a part (hatched part D in FIG. 10) facing the optical component 3 in the optical waveguide member formed with the substrate 1, the holding substrate (in a case where the holding substrate is present) 11 holding the substrate 1, the reinforcing block 10 disposed on the substrate 1, or the like. Roughness of the "rough part" illustrated in each drawing is highlighted compared to the actual roughness for reference.

Figures 5A, 5B, 6A, 6B:
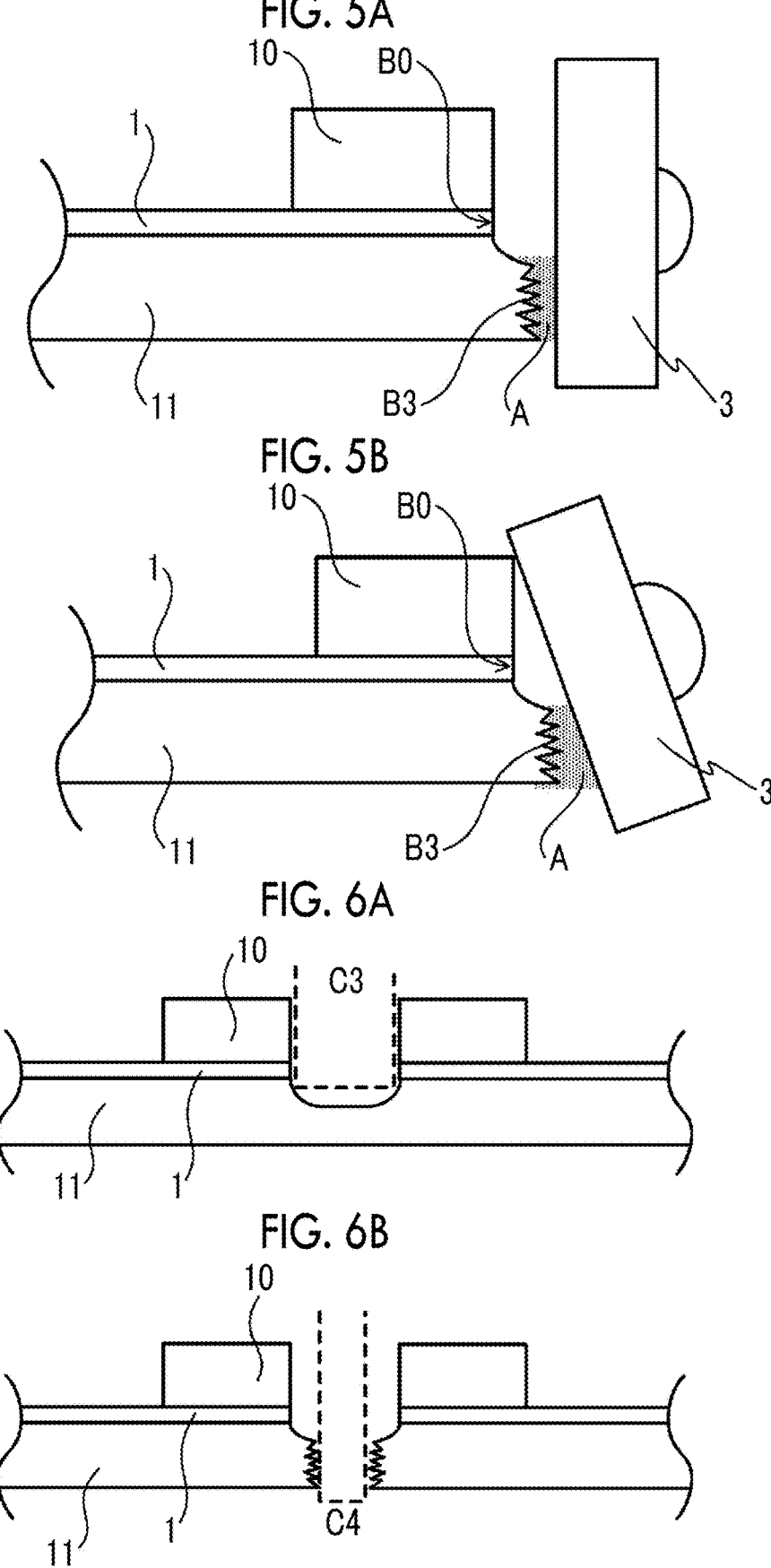
FIGS. 5A and 5B are side views for describing a second example related to the optical waveguide device of the present invention.
FIGS. 6A and 6B are diagrams for describing a part of a process of manufacturing the optical waveguide device in FIGS. 5A and 5B.

In addition, while a state where the "rough part" has entered a substrate 1 side with respect to the end surface B0 on which the input port or the output port is formed is illustrated in FIGS. 3A and 3B, 7, and 8, a state where the "rough part" protrudes with respect to the end surface B0 is illustrated in FIGS. 5A and 5B. Of course, both rough parts can be combined with each other.

Furthermore, a depth (a distance from the end surface B0 to the end surface B2 in FIGS. 3A and 3B and a distance from the end surface B0 to the end surface B5 in FIG. 7) of a notched portion may be set within a range of 5 μm or higher and 300 μm or lower. As the depth of the notch is increased, an anchoring effect of an adhesive A can be increased. However, in a case where the notch is excessively deep, mechanical strength of the substrate or the like constituting the optical waveguide member is weakened.

In FIGS. 3A and 3B, the notched portion is provided in a part of the holding substrate 11, and the "rough part" (B1, B2) is formed in at least a part of a surface on which the notched portion is formed. An adhesive for joining the optical component 3 is disposed on only the rough part B1 in FIG. 3A and on both of the rough parts B1 and B2 in FIG. 3B to complement an insufficient adhesive on the substrate end surface B0, and the optical component 3 can be firmly fixed to the substrate 1 side.

As illustrated in FIGS. 3A and 3B and 7, a curved surface (R, R1, R2) is provided between rough parts (B1 and B2, B4 and B5, B5 and B6). By doing so, for example, concentration of stress on a corner portion formed by the "rough part" (B1, B2) is dispersed. Thus, generation of a crack or the like in the holding substrate 11 can be suppressed. This is more suitable particularly in a case where a distance between the curved surface and the substrate 1 is 300 μm or lower, because an effect of the crack or the like on the optical waveguide of the substrate 1 can be reduced. Of course, even in a case where the curved surface is not provided on the corner portion formed by the "rough part", an effect of the present invention can still be obtained while a risk of generation of the crack or the like is increased.

In addition, in providing the curved surface, in a case where the curved surface has the same or higher surface roughness than the nearby rough part, concentration of stress on the curved surface is likely to occur because of the internal stress of the adhesive that has entered the part. Thus, this causes a crack or the like on the curved surface. In order to avoid this, roughness of the curved surface may be finished to be smoother than an other rough part (B1 to B6).

A shape of the "notched portion" is not limited to that in FIGS. 3A and 3B and 7. For example, the "notched portion" can also be formed by chamfering a corner portion of the holding substrate 11 as illustrated in FIG. 8. A part to be chamfered may be a corner portion of the substrate 1 or of the reinforcing block 10.

An example of a method of forming the end surface including the "rough part" as illustrated in FIGS. 3A and 3B is illustrated in FIGS. 4A and 4B. While an example using the holding substrate 11 is described in FIGS. 4A and 4B, the same applies to the case of only the thick substrate 1 without the holding substrate 11. In cutting into a chip (a single optical waveguide device) in a state where the reinforcing block 10 is bonded to the substrate 1, the holding substrate 11 is notched with a cutting blade C1, and then cutting into the chip is performed with a cutting blade C2 having a smaller blade thickness than the cutting blade C1. Teeth of the cutting blade C1 have higher roughness than teeth of the cutting blade C2. The "rough part" of the present invention is formed on a surface with which the cutting blade C1 is brought into contact. The cutting blade C2 having fine teeth is used on a part including the end surface of the substrate 1 on which the input port or the output port of the optical waveguide device is disposed, to finish the end surface to be smooth (as a specular surface).

In addition, in finishing the curved surface R in FIGS. 3A and 3B to be smoother than the other rough part (B1 to B6), only a part corresponding to the curved surface R can be locally mechanically processed using a grindstone for polishing having a smaller width, an electron beam, or the like after, for example, FIG. 4A. In addition, smoothness can be adjusted by adjusting a shape, a material, a rotation speed, a feed speed, and the like of the cutting blade.

FIGS. 5A and 5B illustrate an example of disposing the optical component 3 away from the end surface B0 of the substrate 1 including the input port or the output port. In the optical waveguide device in FIGS. 5A and 5B, at least a part (B3) of the rough part formed on the holding substrate 11 protrudes to an optical component 3 side with respect to the end surface B0 of the substrate 1 on which the input port or the output port is formed. While the optical component 3 is disposed parallel to a surface of the rough part B3 in FIG. 5A, the optical component 3 is disposed to be inclined with respect to the surface of the rough part B3 in FIG. 5B. The configuration in FIG. 5B can not only hold the optical component more stably than the configuration in FIG. 5A but also contributes to suppression of reflective light to the optical waveguide caused by reflection of the light wave on a surface of the optical component 3 on the substrate 1 side. While an adhesive is not present between the optical component and the end surface B0 in the configurations in FIGS. 5A and 5B, an adhesive may be provided between the optical component and the end surface B0.

An example of a method of forming the end surface including the "rough part" as illustrated in FIGS. 5A and 5B is illustrated in FIGS. 6A and 6B. In fixing the reinforcing block 10 to the substrate 1 (including the holding substrate 11) and cutting into each chip, a cutting blade C3 is provided from a reinforcing block side, and then cutting into the chip is performed with another cutting blade C4 having a smaller blade thickness than the cutting blade C3. In this case, the "rough part" B3 can be formed by setting teeth of the cutting blade C4 to have higher roughness than teeth of the cutting blade C3.

While an example of applying the cutting blade perpendicular to the surface of the substrate 1 or the like is illustrated in FIGS. 3A and 3B to 6A and 6B, it is also possible to form a groove by cutting from a horizontal direction (a direction parallel to the surface of the substrate 1) in FIG. 7 and to form the rough part (B4 to B6) on a surface of the groove as illustrated in FIG. 7.

FIG. 9 is a diagram of the end surface of the optical waveguide member illustrating a state where the spot size converter (SSC) is provided in the input port or the output port of the optical waveguide 1. It is required to form the "rough part" outside the mode field diameter (MFD) (dotted line S illustrates a boundary part of the MFD) of the SSC so that the light wave propagating through the SSC is not scattered by the "rough part". More preferably, the "rough part" is formed at a position separated from the MED by 5 μm or higher. Reference sign 4 is an adhesive layer for connecting the holding substrate 11 (including the substrate 1 and the SSC) to the reinforcing block 10.

The SSC may be obtained by directly processing the optical waveguide by, for example, gradually changing a waveguide width of an end portion of the optical waveguide formed on the substrate 1 or by forming the SSC as a separate body on the end portion of the optical waveguide formed on the substrate 1. In the former configuration, the optical component is fixed to the end portion of the optical waveguide on which the SSC is formed, the holding substrate, or the reinforcing block. In the latter configuration, the optical component is fixed to the SSC as a separate body from the optical waveguide, the holding substrate, or the reinforcing block. In the configuration in which the SSC is formed, the SSC also constitutes a part of the optical waveguide member.

Figure 10:
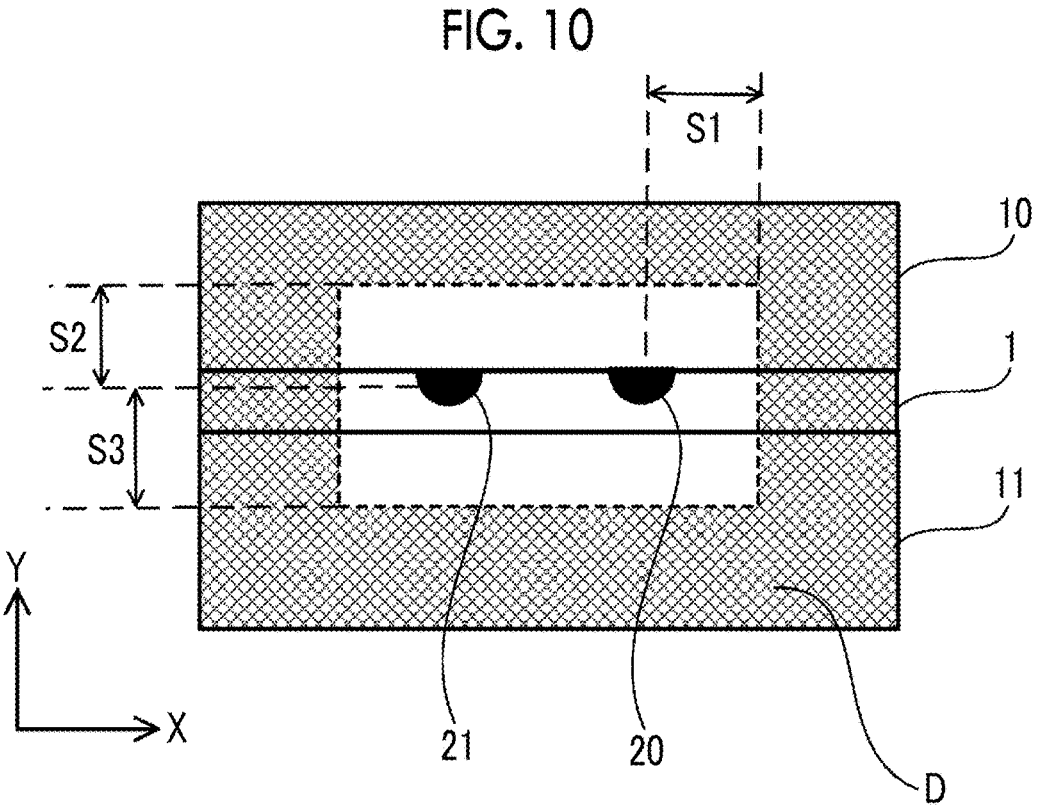
FIG. 10 is a diagram for describing a region in which the "rough part" related to the optical waveguide device of the present invention is formed.

FIG. 10 is a diagram for describing a region in which the rough part is formed. FIG. 10 illustrates a surface on which an input port 20 and an output port 21 of the light wave are disposed. In a case where the rough part D is present near the input port 20 or the output port 21 of the light wave, internal stress generated by joining between the rough part and the optical component also affects the optical waveguide and, in the worst case, changes the refractive index of the optical waveguide. Thus, the "rough part" (D) is formed in a region separated from the optical waveguide (20, 21) by a certain distance (S1 to S3) as illustrated in FIG. 10. This distance (S1 to S3) may be set to 5 μm or higher. More preferably, 10 μm or higher is set.

Furthermore, roughness of the rough part (D) may be 50 nm or higher in arithmetic average roughness Ra from the viewpoint of increasing joining strength of the adhesive. Roughness of the end surface of the substrate 1 on which the input port or the output port is formed is required to be set to 10 nm or lower.

In the region D in which the rough part can be formed in FIG. 10, not only the "rough part" as illustrated in FIGS. 3A and 3B, FIGS. 5A and 5B, or FIG. 7 can be formed, but also a saw mark that runs in the horizontal direction or a vertical direction parallel to the surface in FIG. 10 or furthermore in an inclined direction can be used as the "rough part". While a configuration in which the end surface (B0) of the substrate and the rough part of the holding substrate are not in the same plane and have a level difference has been described so far, the end surface (B0) of the substrate and the rough part of the holding substrate may be in the same plane. The same plane can be formed by setting the cutting blade C1 and the cutting blade C2 in FIGS. 4A and 4B to have the same blade thickness or by setting the cutting blade C3 and the cutting blade C4 in FIGS. 5A and 5B to have the same blade thickness. Here, the "same plane" is a concept including a level difference based on processing accuracy generated in cutting with different cutting blades.

Figure 11:
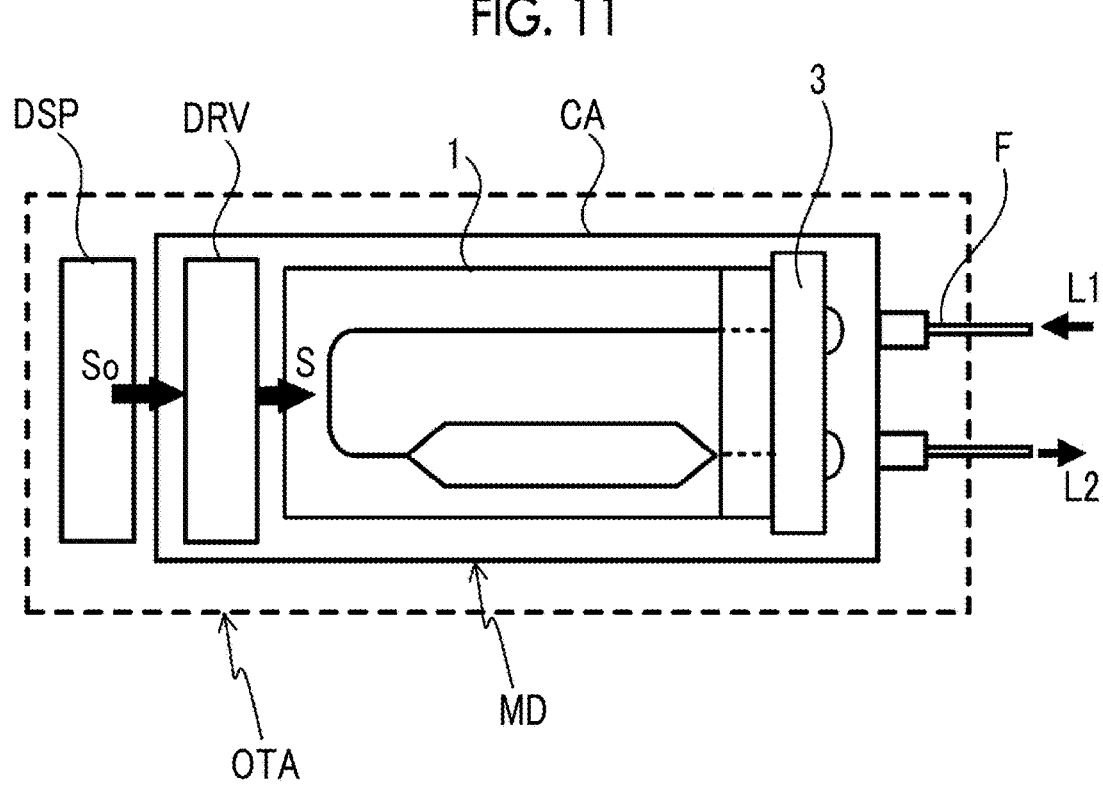
FIG. 11 is a plan view for describing an optical modulation device and an optical transmission apparatus of the present invention.

In the optical waveguide device of the present invention, a modulation electrode that modulates the light wave propagating through the optical waveguide is provided in the substrate 1 and is accommodated inside a case CA as illustrated in FIG. 11. Furthermore, an optical modulation device MD can be configured by providing an optical fiber F through which the light wave is input into the optical waveguide or output from the optical waveguide. The optical fiber can not only be disposed outside the case CA as in FIG. 11 but also be disposed to be fixed by introducing the optical fiber into the case through a through-hole that penetrates through a side wall of the case.

An optical transmission apparatus OTA can be configured by connecting, to the optical modulation device MD, an electronic circuit (digital signal processor DSP) that outputs a modulation signal causing the optical modulation device MD to perform a modulation operation. The modulation signal to be applied to the optical waveguide device is required to be amplified. Thus, a driver circuit DRV is used. The driver circuit DRV and the digital signal processor DSP can be disposed outside the case CA or can be disposed inside the case CA. Particularly, disposing the driver circuit DRV inside the case can further reduce a propagation loss of the modulation signal from the driver circuit.

INDUSTRIAL APPLICABILITY

As described above, according to the present invention, it is possible to provide an optical waveguide device that can prevent detachment of an optical component caused by internal stress generated in a joined portion between the optical component and an optical waveguide member including a substrate on which an optical waveguide is formed and that can simplify a manufacturing process related to polishing processing of surfaces to be joined. In addition, an optical modulation device and an optical transmission apparatus using the optical waveguide device can be provided.

REFERENCE SIGNS LIST

1: substrate
2: optical waveguide
3: optical block (optical component)
10: reinforcing block
A: surface to be joined (adhesive)
MD: optical modulation device
OTA: optical transmission apparatus
B1 to B6: rough part

The invention claimed is:

1. An optical waveguide device comprising:
an optical waveguide member including a substrate on which an optical waveguide is formed; and
an optical component that is fixed to an end surface of the optical waveguide member on which an input port or an output port of the optical waveguide is disposed and that allows transmission of input light into the input port or transmission of output light from the output port,
wherein a rough part having higher roughness than the end surface of the optical waveguide member including the input port or the output port is provided in a part which is at least a part of the optical waveguide member and to which the optical component is fixed, and a notched portion is provided in a part of the optical waveguide member, and the rough part is provided on at least a part of a surface on which the notched portion is formed.

2. The optical waveguide device according to claim 1, wherein a depth of the notched portion is set within a range of 5 μm or higher and 300 μm or lower from the end surface including the input port or the output port.

3. The optical waveguide device according to claim 1, wherein the optical component has a different coefficient of thermal expansion from at least a part of a member constituting the end surface of the optical waveguide member in a direction parallel to the end surface of the optical waveguide member.

4. The optical waveguide device according to claim 1, wherein a spot size converter is provided in at least one of the input port or the output port of the optical waveguide.

5. The optical waveguide device according to claim 1, wherein an adhesive for joining the optical component is provided on at least a part of the rough part.

6. The optical waveguide device according to claim 1, wherein roughness Ra of the rough part is 50 nm or higher.

7. The optical waveguide device according to claim 1, wherein a distance from any of the input port or the output port to a position at which the rough part is formed is set within a range of 5 μm or higher and 300 μm or lower.

8. The optical waveguide device according to claim 1, wherein at least a part of the rough part protrudes to an optical component side with respect to the input port or the output port.

9. The optical waveguide device according to claim 1, wherein at least a part of a location in which a curved surface is formed in a region in which the rough part is formed has lower roughness than an other rough part.

10. An optical modulation device comprising:
the optical waveguide device according to any one of claim 1 including an electrode that modulates a light wave propagating through the optical waveguide;
a case accommodating the optical waveguide device; and
an optical fiber through which the light wave is input into the optical waveguide or output from the optical waveguide.

11. The optical modulation device according to claim 10, wherein an electronic circuit that amplifies a modulation signal to be input into the optical waveguide device is provided inside the case.

12. An optical transmission apparatus comprising:
the optical modulation device according to claim 10; and
an electronic circuit that outputs a modulation signal causing the optical modulation device to perform a modulation operation.

* * * * *